United States Patent [19]

Blumberg et al.

[11] Patent Number: 4,812,073

[45] Date of Patent: Mar. 14, 1989

[54] METHOD AND APPARATUS FOR FASTENING A SEALING BELLOWS

[75] Inventors: Willy Blumberg, Meerbusch; Hans J. Schütt, Aachen; Ulrich Mette, Essen; Karl H. Barbet, Korschenbroich; Fritz Busse, Hilden; Benno Klier, Meerbusch, all of Fed. Rep. of Germany

[73] Assignee: TRW Ehrenreich GmbH & Co KG, Dusseldorf, Fed. Rep. of Germany

[21] Appl. No.: 127,507

[22] Filed: Dec. 1, 1987

[30] Foreign Application Priority Data

Dec. 1, 1986 [DE] Fed. Rep. of Germany ....... 3641030

[51] Int. Cl.⁴ .......................... F16C 11/00; F16D 1/02
[52] U.S. Cl. ..................... 403/134; 29/520; 285/256; 403/133; 403/140
[58] Field of Search ............... 403/122, 124, 132, 134, 403/133; 72/462; 29/788, 437, 441.1, 438, 149.5 B, 724, 725; 285/256

[56] References Cited

U.S. PATENT DOCUMENTS

| | | | |
|---|---|---|---|
| 2,818,636 | 1/1958 | Fentress et al. | 29/454 |
| 3,225,420 | 12/1965 | Sullivan, Jr. | 29/441.1 X |
| 3,422,526 | 1/1969 | Schmidt | 29/520 X |
| 4,087,188 | 5/1978 | McEowen | 29/149.5 X |
| 4,208,943 | 1/1980 | Smith | 411/361 |
| 4,392,678 | 7/1983 | Adamczyk | 285/256 |
| 4,714,368 | 12/1987 | Swada et al. | 403/140 X |

FOREIGN PATENT DOCUMENTS

| | | |
|---|---|---|
| 1266573 | 4/1968 | Fed. Rep. of Germany . |
| 1525083 | 7/1970 | Fed. Rep. of Germany . |
| 3339874 | 6/1985 | Fed. Rep. of Germany . |
| 1367898 | 6/1964 | France ............... 29/149.5 |
| 973995 | 11/1964 | United Kingdom . |

Primary Examiner—James T. McCall
Attorney, Agent, or Firm—Tarolli, Sundheim & Covell

[57] ABSTRACT

Method and apparatus for fastening of a sealing bellows (3) to a ball joint housing (1) in motor vehicles wherein the sealing bellows (3) has a housing end rim (16) that engages an approximately cylindrical bellows seat (11) formed on the outer rim of the joint housing defining an opening (10) through which a shank extends, and a retaining ring (5) made of sheet metal and surrounding the housing end bellows rim (16) for sealingly connecting the bellows to the housing, has an outer circumferential recess (17), is slipped onto the housing end bellows rim (16), and is then axially compressed so that its inner diameter is reduced, whereby the housing end bellows rim (16) sealingly engages the bellows seat (11) on the joint housing (1).

8 Claims, 3 Drawing Sheets

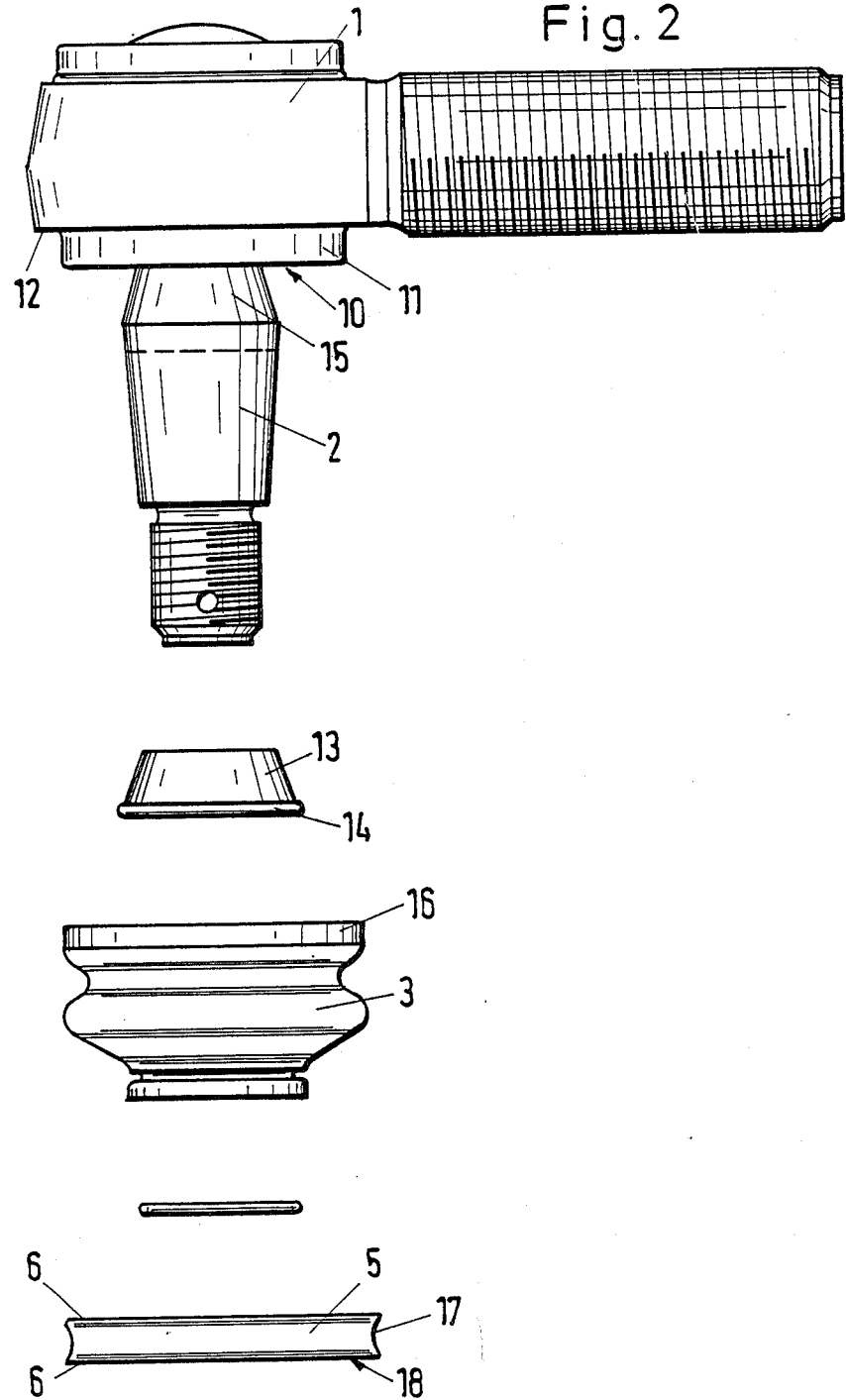

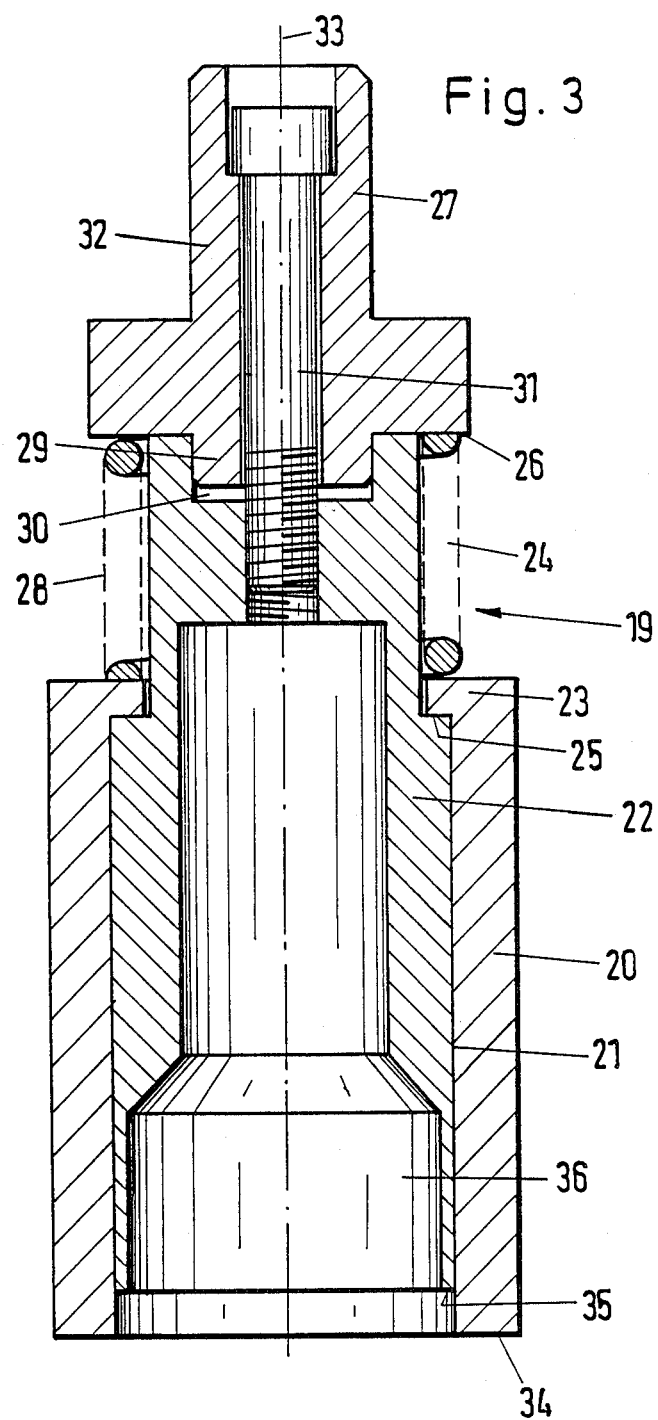

METHOD AND APPARATUS FOR FASTENING A SEALING BELLOWS

The invention relates to a method and apparatus for fastening a sealing bellows to a joint housing of a ball joint, especially of a ball joint for use in motor vehicles. The sealing bellows has a housing end rim that engages a substantially cylindrical bellows seat formed by an outer rim of a housing opening, and is sealed against the bellows seat by a retaining ring made from sheet metal and encircling the housing end rim of the bellows. The ring has a zone of a smallest diameter formed by a concave recess curved radially inward.

German Pat. No. 1,525,083 discloses a sealing bellows for sealing an opening in a joint housing of a ball joint through which a shank extends. The bellows has a rim portion received in a circular groove in the joint housing and is fixed in the groove by a spring ring or a wire sling. The disadvantage of using a spring ring or a wire sling for fastening a sealing bellows is that the mounting of the sealing bellows is very costly. Namely, the sealing bellows must first be inserted into the bellows groove in the outer rim of the housing opening. Then the spring ring or the wire sling must be widened to the largest diameter of the sealing bellows, pushed over the sealing bellows, and positioned with care on the bellows rim, so that the rim will not be damaged. Because the pressure is unevenly distributed around the inner circumference of the spring ring or the wire sling, a very high preload is required in order to achieve complete sealing. The high preload in combination with a usually small cross-section of the spring ring or the wire sling and sharp edges of the spring ring or the wire sling can easily lead to the damage of the bellows rim.

German Pat. No. 1,266,573 discloses a sealing bellows having a rim received in a ring groove formed in an axial end surface of a joint housing. The outer wall of the groove can be rolled in against the sealing bellows. The ring groove must be formed during manufacture of the joint housing. In practice, however, it has been found that rolling-in of the free-standing side wall of the groove against the rim of the sealing bellows is extremely difficult if deformation of the sealing bellows is to be avoided.

German Pat. No. 3,339,874 discloses another means for fastening a sealing bellows in a ring groove formed at an axial end surface of the outer rim of a housing opening and defined by an L-shaped circumferential surface on the housing rim and an L-shaped retaining ring fastened to a housing portion adjacent the L-shape surface. The cylindrical outer wall of the retaining ring is bent radially inward to engage the bellows rim. To fasten the retaining ring to the housing, projections are punched out of a ring step at the bottom of the groove. Punching of the retaining ring is, however, technologically difficult because it must be done with a tool which must work precisely under a heavy load. Moreover, the rolling-in of the outer wall of the retaining ring without deforming the sealing bellows is difficult.

Finally, British Pat. No. 973,995 discloses fastening of a sealing bellows to a ball joint housing with a retaining ring wherein an end portion of the retaining ring is folded to form a recess directed radially inward and in which the bellows rim is received.

The object of the invention is an improved method and apparatus for fastening of a sealing bellows to a joint housing of a ball joint which method and apparatus make possible satisfactory and uniform sealing and simplifies manufacture.

To achieve the object of the invention, it is proposed to form in the retaining ring a concave recess curved inward a predetermined amount and, after the retaining ring is slipped over the housing end rim of the bellows, to compress the retaining ring axially to reduce the inner diameter in the axial zone of the recess so that the retaining ring would sealingly force the housing end rim of the bellows against the bellows seat on a housing rim.

When fastening a sealing bellows to a joint housing according to the invention, first the retaining ring is slipped onto the housing end rim of the sealing bellows after the sealing bellows is placed onto the bellows seat of the housing. If the largest diameter of the sealing bellows exceeds the inner diameter of the retaining ring, the sealing bellows and the retaining ring can be preassembled and pushed together onto the bellows seat of the joint housing. This preassembly is simplified because the inner diameter of the retaining ring is selected such that it corresponds approximately to the outer diameter of the housing end rim of the sealing bellows, and the inner diameter of the housing end rim of the sealing bellows is selected such that it corresponds to the outer diameter of the bellows seat.

To fasten the retaining ring and the sealing bellows to the joint housing, the retaining ring is axially compressed so that its inner diameter is reduced, especially in the zone of the concave recess formed in the outer circumferential surface of the retaining ring. The forces applied, when the retaining ring is axially compressed, are small since the retaining ring is made of sheet metal. It is possible to axially compress the retaining ring uniformly with a socket-shaped compression tool applied to the circumference of the ring whereby the inner diameter of the ring is evenly reduced, and the bellows rim is uniformly and sealingly pressed against the bellows seat. Contrary to this, the previously known method of bending in or rolling in of the outer wall of a ring groove comprises, as a rule, consecutive bending or rolling of outer wall sections which results in an uneven distribution of the material of the bellows rim in the ring groove.

In one embodiment of the invention, the concave recess of the retaining ring is continuous and is curved symmetrically toward its transverse central plane so that the retaining ring, even after axial compression engages the bellows rim by the curved portion. This prevents damage to the rim. The symmetrical curving of the retaining ring provides for uniform deformation of the ring during axial compression thereof.

In another embodiment, the axially compressed retaining ring has its outer edges bent inward towards its transverse central plane so that the outer edges are flush at the transverse central plane of the ring. Thus, the bent-in edges of the retaining ring do not protrude in such a way that they might cause injury during mounting or repair. A significant stiffening of the axially compressed retaining ring is obtained since the outer bent-in edges located adjacent respective portions of the ring prevent subsequent widening of the retaining ring whose inner diameter has been reduced by axial compression.

In another embodiment, a ring step located adjacent the bellows seat of the housing provides a support for the retaining ring when the ring is axially compressed. Without such a ring step, the retaining ring, when axially compressed, would have to be supported by a retaining tool.

An apparatus for fastening a sealing bellows according to the invention may comprise a retaining tool for supporting a retaining ring positioned on the bellows rim. The retaining ring may be supported instead of the retaining tool by a ring step formed on the joint housing, adjacent the bellows seat. The apparatus further comprises a working tool including a ring retainer and a work die movable in relation to the ring retainer against a force of a return spring. The work die is set at one end onto the retaining ring so that the ring, upon movement of the work die, is axially compressed, the shank of the ball stud, the sealing bellows, and the bellows seat of the ball joint housing being received in a cavity in the work die.

The apparatus according to the invention provides initially for retaining the retaining ring in a predetermined position relative to the ball joint housing. The work die is movable relative to a retaining tool. A ring retainer fixes the ring to the ball joint so that the ring cannot move during axial compression of the retaining ring. Then, the work die compresses the retaining ring. The compression force is evenly applied to the circumferential surface of the retaining ring. This work die has a cavity for receiving at least partially the shank of the ball stud, the sealing bellows, and the bellows seat. After the sealing bellows has been fastened to the joint housing, the work tool is lifted from the ball joint, and the ring retainer and the work die return to their original position under the action of the return spring, and the working tool is ready for another fastening operation. The fastening apparatus consists of only a few elements and has a work die which moves only along one axis of movement.

In another embodiment, the ring retainer has an inner guide along which the work die moves relative to the ring retainer. The work die has opposite stop surfaces for engaging respective end stops to limit the movement of the work die relative to the ring retainer. The work die is actuated by a drive head which extends above the inner guide to be fastened to a suitable drive. A compression return spring is located between respective support surfaces on the drive head and the ring retainer. In this embodiment, the driven work die is mounted inside of the ring retainer in such a way that it does not move relative to the ring retainer if not acted upon. When the work tool applied to a ball joint, an end surface of the ring retainer engages the joint housing. The work die slides along the inner guide of the ring retainer which is now fixed, to cause one end thereof to engage the retaining ring which is received within the ring retainer, and to compress the ring axially. The return spring, designed as a compression spring, expands between the drive head and the ring retainer so that the ring retainer is returned to its original position by the spring. When the ball joint is positioned with the stud extending vertically upward, and the axis of movement of the work took extends also vertically, the device may, in principle, be operated without a compression spring, because the ring retainer will return to its original position by the gravity force.

In another embodiment, a socket shaped ring retainer has at its drive head end a rim flange, directed inward, which extends between a surface of the work die and a collar-like support surface on the drive head fastened to the driven die. The compression spring is located in the space formed between the rim flange and a support surface on the drive head. This construction is especially rigid and simple.

Finally, in one embodiment of the apparatus, the inner guide of the ring retainer engages the outer surface of the undeformed retaining ring, so that the ring, in the zone of outer edges, can be turned back on itself to the transverse central plane.

Other details and advantages of the invention will appear from the description which follows with reference to respective drawings which show the process of fastening and an apparatus according to the invention. In the drawings:

FIG. 2 is an exploded view of a sealing bellows, a retaining ring, a compressing ring, and a deflection limiter;

FIG. 3 shows a longitudinal sectional view of a work tool for fastening a sealing bellows to the joint housing.

Figure 1:
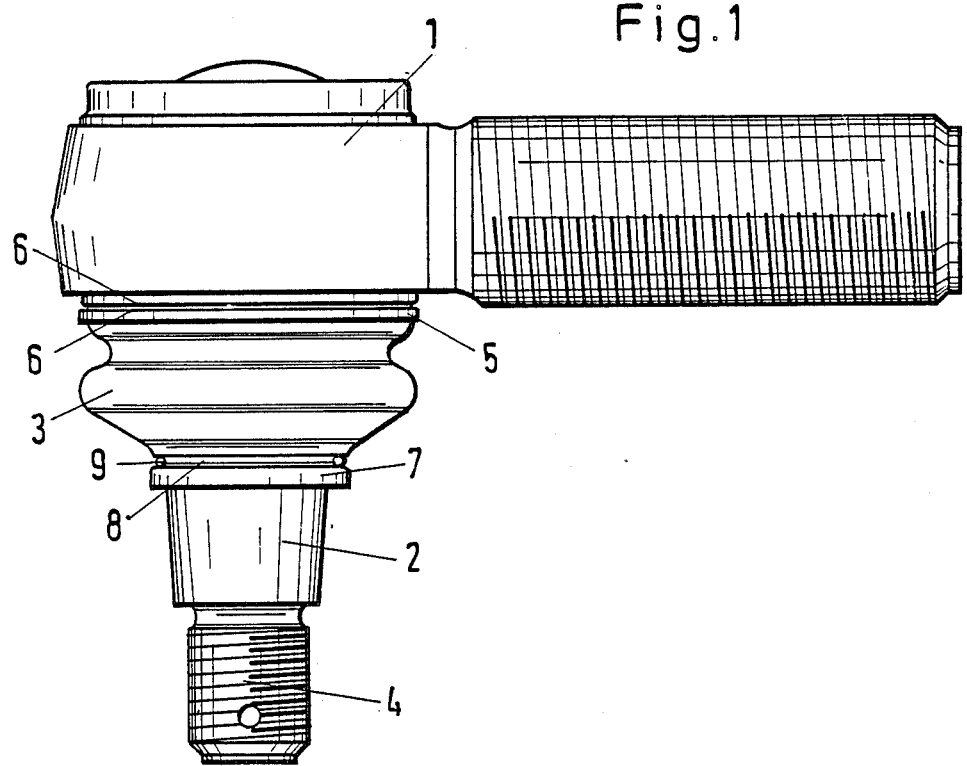
FIG. 1 is a front view of a sealing bellows and the housing of a ball joint.

FIG. 1 shows a ball joint comprising a joint housing 1, a ball stud 2 pivotably or rotatably supported in the housing and projecting out of a housing opening, and a sealing bellows 3 made of a resilient material for sealing the clearance between a housing wall of the joint housing 1 and the ball stud 2.

The sealing bellows 3 is symmetrical with respect to the ball stud axis 4 and has a large housing end rim to be fastened to the joint housing 1 with a retaining ring 5. The retaining ring 5 has outer flanges 6 the edges of which are turned back to its transverse central plane and can abut each other near the transverse central plane.

The sealing bellows 3 has a small end rim 7 for fastening to the ball stud 2 with the ball stud 2 being rotatable relative to the bellows rim 7. To this end, the bellows rim 7 has a circumferential groove 8 for receiving a clamping ring.

Details of fastening of the sealing bellows 3 to the joint housing 1 can be explained better with reference to FIG. 2. The joint housing 1 has on the outer rim of an opening 10 through which the ball stud 2 extends, a cylindrical bellows seat 11. Adjacent the bellows seat 11, the joint housing 1 has a circumferential ring step 12.

Before fastening of the sealing bellows 3, a deflection limiter 13 made of a plastic material and having a ring bead 14 for supporting the stud end rim 7, is pushed onto a shoulder 15 of the ball stud.

Then the large housing end rim 16 of the sealing bellows 3 which rim has circular inner and outer surfaces, is pushed onto the bellows seat 11 which is also cylindrical. The inner diameter of the bellows rim 16 is advantageously so chosen so that it engages the bellows seat 11 with a slight preload.

Then, the retaining ring 5 is pushed over the housing end rim 16, until it engages the ring step 12. To facilitate pushing of the retaining ring 5, the sealing bellows may be so dimensioned that the outer diameter of the rim 16 is at least as large as the outer diameter of the largest bulge of the bellows. The retaining ring 5 may, however, be preliminarily mounted on the bellows rim 16 before the bellows rim 16 is pushed onto the bellows seat 11.

The retaining ring 5 has a concave circumferential recess 17 on its outside surface which recess in the example shown, is continuous and curved symmetrically toward its transverse central plane. When the retaining ring 5 is preliminarily assembled with the bellows rim 16, and the latter is then mounted on the bellows seat 11, the retaining ring 5 may be axially compressed at its end remote from the ring step 12. To this end, for example, a round cylindrical die may be pushed over the ball stud 2 and the sealing bellows 3, and be set against an end 18. A retaining tool is also needed to support the ball joint against movement in the direction of application of the die.

Upon axial compression of the retaining ring 5, its diameter decreases, especially in the zone of the recess 17 which provides for flow of the material of the retaining ring 5. The latter is advantageously made of a relatively thin metal sheet, for example, of steel. Retaining rings of aluminum, copper, lead or other easily formed metal materials may also be considered. The distribution of stresses in the retaining ring 5, and deformation forces acting on its end surfaces cause deflection of its outer edges of flanges 6 back toward its transverse central plane, and finally, as shown in FIG. 2, the edges abut each other almost flush near its transverse central plane. In this way, the retaining ring 5 provides for fastening of the bellows in its deformed condition. FIG. 3 shows a work tool 19 for fastening according to the invention. The work tool has a socket shape ring retainer 20 with an inner guide 21 relative to which a work die 22 can move. The ring retainer 20 has a rim flange 23 facing inward and engaging the surfaces defining a recess 4 of the work die 22. The recess 24 is limited at one end by a shoulder 25 of the work die 22 and at the other end by a collar-like support surface 26 on a drive head 27 fastened to the work die 22. A compression spring 28 located in the recess 24, is supported against the shoulder 25 and the support surface 6 and is guided along its inner circumference by the outer surface of the work die 22. The drive head 27 has a cylindrical extension 29 for guiding the head in a centering bore 30 of the work die 22. The drive head 27 is attached to the work die 22 with a cylindrical screw 31. The drive head 27 is also provided, outside, with another cylindrical extension 32 for fastening to a drive device. The work tool 19 is symmetrical with respect to a central axis 33 along which the tool moves. The work tool 19 is moved to fasten a sealing bellows preferably along a vertical axis and is lowered onto a ball joint which is positioned with the ball stud pointing vertically upward on a retaining tool (not shown). The sealing bellows and the retaining ring are already premounted on the ball joint. Upon lowering of the work tool 19, its central axis 22, the axis of movement, coincides with the axis of the ball stud.

Initially, the base 34 of the ring retainer 20 lies against the ring step 12 of the joint housing 1 and, thus, the ball joint is fixedly connected to the retaining tool. Upon lowering of the drive head 27, the work die 22 moves relative to the retainer 20 along the inner guide 21, while the compression spring 28 is preloaded. The distance of an end 35 of the work die 22 from the base 34 of the retainer 20 corresponds before movement of the work die 22 relative to the retainer 20, to at least the height of the retaining ring 5. The retaining ring 5 is compressed only axially when the retainer sits on the joint housing and holds the ring fast.

The ball stud 2, the sealing bellows 3, and the bellows seat 11 of the ball joint housing (not shown) are received at least partially in a hollow space 36 of the work die 22.

When the retaining ring 5 is axially compressed upon movement of the work die 22 along the inner guide a predetermined amount, corresponding approximately to half the height of the undeformed retaining ring 5, the lowering of the work die 22 is stopped, and the latter is pulled out of the ball joint again. Thereafter, the retainer, under the influence of the compression spring 28, returns quickly to its initial position in which the rim flange 23 engages the shoulder 25. Then the work die is ready for fastening of another retaining ring.

It should be emphasized that with an apparatus according to the invention, retaining rings might be axially compressed by a simple axial movement of the work die between two reversal points.

We claim:

1. Fastening of a sealing bellows (3) to a joint housing (1) of a ball joint, especially a ball joint for use in motor vehicles wherein the sealing bellows (3) has a housing end bellows rim (16) that engages an approximately cylindrical bellows seat (11) formed on the outer rim of a housing opening (10), and is biased against the bellows seat (11) by a retaining ring (5) made of a sheet metal, surrounding the housing end bellows rim (16), and having a zone of a smallest diameter defined by a circumferential concave recess (17) curved radially inward, characterized in that the curving of the concave recess (17) of the retaining ring (5), before the fastening of the sealing bellows(3) is effected only to an extent such that the retaining ring (5) can be slipped over the housing end bellows rim (16), and that the retaining ring (5) for fastening of the sealing bellows (3) is axially compressed to reduce its inner diameter in the axial zone of the concave recess whereby the ring sealingly biases the housing end bellows rim (16) against its bellows seat (11).

2. Fastening according to claim 1, characterized in that the circumferential concave recess (17) of the retaining ring (5) before the sealing bellows is fastened is continuous, and is symmetrically curved relative to the transverse central plane of the retaining ring (5).

3. Fastening according to one of claims 1 or 2, characterized in that the outer edges (6) of the axially compressed retaining ring (5) are turned back to its transverse central plane and the outer edges (6) lie almost flush at the transverse central plane.

4. Fastening according to one of claims 1 or 2, characterized in that a circumferential ring step (12) is formed adjacent the housing bellows seat (11) for supporting the retaining ring (5) upon axial compression thereof.

5. A method of fastening of a sealing bellows to a ball joint housing comprising the steps of:
mounting the sealing bellows on the ball joint housing by pushing a housing end rim of the sealing bellows onto a bellows seat of the ball joint housing;
providing a retaining ring made of sheet metal and having a circumferential concave recess extending radially inward of the ring and an inner diameter in the axial zone of the recess approximately equal to the outer diameter of the housing end rim of the sealing bellows;
slipping the retaining ring over the housing end rim of the sealing bellows; and
axially compressing the retaining ring to reduce the inner diameter of the retaining ring in the axial zone of the concave recess to clamp the housing end rim of the sealing bellows against the bellows seat of the housing.

6. A method as set forth in claim 5 wherein the step of providing a retaining ring made of sheet metal and having a circumferential concave recess extending radially inward of the ring comprises the step of forming a continuous circumferential concave recess symmetrically curved relative to the transverse central plane of the retaining ring.

7. A method as set forth in claim 5 wherein the step of axially compressing the retaining ring comprises the step of compressing opposite outer edges of the retaining ring to turn them back so that the edges lie almost flush in a plane extending perpendicular to the transverse central plane of the retaining ring.

8. A method as set forth in claim 5 further comprising the step of providing a circumferential ring step adjacent the housing bellows seat for supporting the retaining ring.

* * * * *